R. C. HOFFMAN.
DISK VEHICLE WHEEL.
APPLICATION FILED JULY 6, 1920.

1,376,205.

Patented Apr. 26, 1921.

ROSCOE C. HOFFMAN, INVENTOR.

BY
Lockwood Lockwood
ATTORNEYS.

UNITED STATES PATENT OFFICE.

ROSCOE C. HOFFMAN, OF INDIANAPOLIS, INDIANA.

DISK VEHICLE-WHEEL.

1,376,205.

Specification of Letters Patent.  Patented Apr. 26, 1921.

Application filed July 6, 1920. Serial No. 394,239.

*To all whom it may concern:*

Be it known that I, ROSCOE C. HOFFMAN, a citizen of the United States, and a resident of Indianapolis, county of Marion, and State of Indiana, have invented a certain new and useful Disk Vehicle-Wheel; and I do hereby declare that the following is a full, clear, and exact description thereof, reference being had to the accompanying drawings, in which like numerals refer to like parts.

This invention relates to a disk wheel for vehicles, and particularly that class of wheel for use on the smaller or lighter type of vehicles.

The main object of the invention is to provide a very inexpensive and simple wheel to manufacture, whereby they may be turned out in large quantities by a very simple process of manufacture.

The particular feature of the invention relates to the manner of mounting and securing the tire rim upon the disk wheel, and doing away with the usual construction wherein rivets and welding are used, special reference being had to my application on process of making disk wheel and rim, Serial No. 330,062, filed October 11, 1919, and my application on process of making disk wheel and rim, filed June 21, 1920, Serial No. 390,609.

The full nature of the invention will be understood from the accompanying drawings and the following description and claims.

Figure 1:
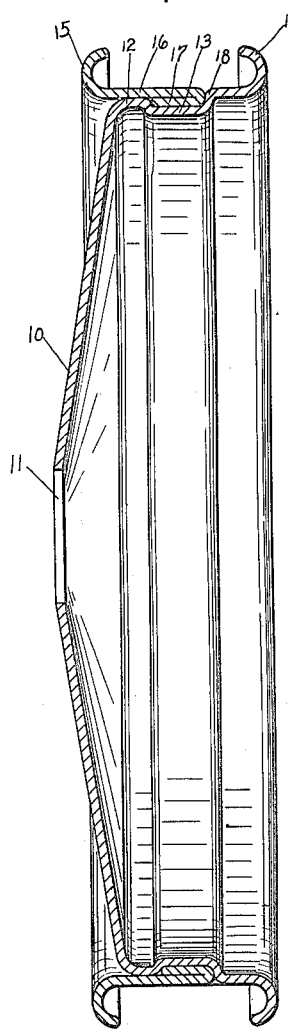
Figure 2:
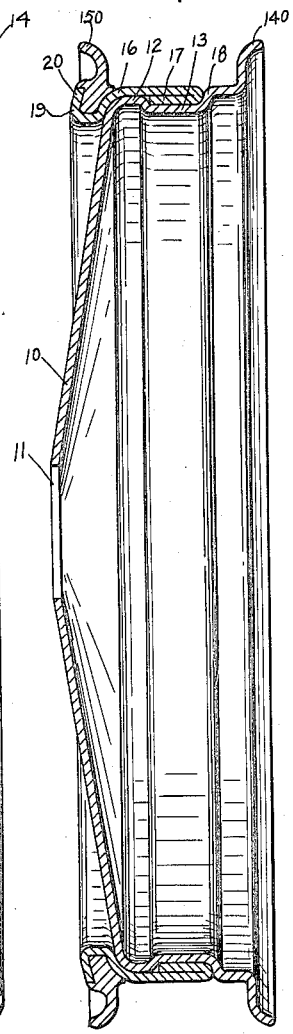
Figure 3:
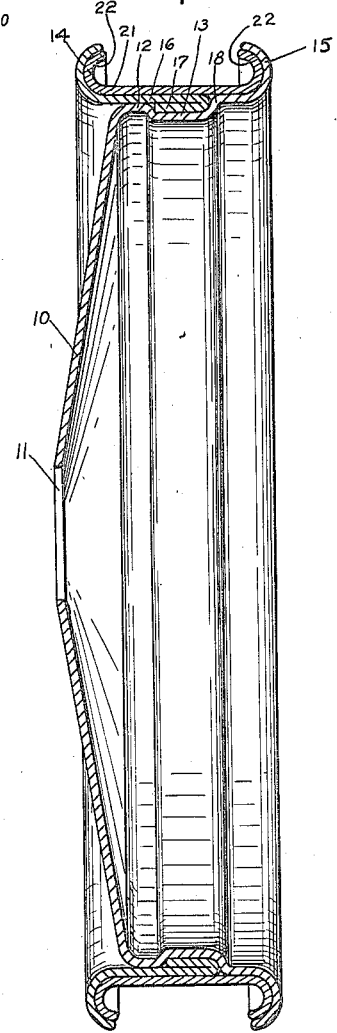

In the drawings, Figure 1 is a central vertical cross section through the disk wheel showing the manner of securing a single complementary flanged rim portion to the disk wheel. Fig. 2 is the same as Fig. 1 showing the manner of securing a complementary rim portion having a detachable flange, to the disk wheel. Fig. 3 is the same as Fig. 1 showing the construction wherein an inner lining or inner rim is added to the wheel formed as shown in Fig. 1.

In the drawings there is shown a metal disk vehicle wheel comprising a solid metal disk portion 10 having a central opening 11 therein upon which the same is mounted over the wheel hub, and having a peripheral rim portion 12 in which there is formed an annular depression 13. Extending radially from the disk 10 there is a tire flange 14 which is turned inwardly in the usual way. The parts above described are integral and are formed from a single piece of sheet metal by stamping and rolling the same in a manner to provide the necessary parts and shapes above noted. Mounted opposite to the flange 14 there is a complementary flange 15 formed upon a separate complementary rim portion 16, the edge of which has been enlarged by doubling it over in the manner disclosed in Fig. 1. After the parts have been formed as above described, the complementary rim portion 16 is spring pressed over the wheel rim 12, so that the enlarged or doubled edge thereof will engage in the annular depression 13 between the rim portion 12 and the shoulder 18, whereby the disk wheel rim will be assembled and completed in the manner described.

For use in connection with the straight bead tire casing, the construction used is that shown in Fig. 2, in which the complementary rim 16 is provided with a recess 19 in place of the flange 15 in which an auxiliary flange 150 is secured, the flanges 150 and 140 being turned outwardly instead of inwardly. In this construction the flange 150 is mounted on the rim 16 before the flange 20 is rolled up into clamping position.

In the construction shown in Fig. 3, there is added to that shown in Fig. 1 an inner rim 21 having adjacent and complementary flanges 22 formed within the flanges 14 and 15. The process of forming the rim construction shown in Fig. 3 is described in detail in my application executed June 11, 1920, and consists in first forming the disk wheel portion without forming the annular depression 13 before forming the shoulder 18, and then mounting the outer rim 21 on the disk wheel rim, so that the flanges 15 and 22 will coincide with each other, the same extending straight upwardly instead of being turned inwardly, as shown. The complementary rim portion 16 is then inserted between the rim 21 and the disk wheel rim 12 so that the enlarged or doubled edge portion 17 abuts the shoulder 18, and the flange 14 lies adjacent the left hand flange 22. The wheel is then rolled, so that the portion 12 of the disk wheel rim is forced outwardly so as to inclose the enlarged or double portion 17 of the auxiliary rim portion in the annular groove 13 formed thereby, and the flanges 14, 15 and 22 are then rolled so as to turn inwardly.

The invention claimed is:

1. A disk wheel and rim integral therewith, formed from a single piece of sheet metal, having an annular depression formed therein, a tire flange formed about the edge of said rim, a rim member having a flange formed thereon, and an enlarged portion on said rim member adapted to seat in said depression for securing said rim member on said rim and locking it in position.

2. A disk wheel and rim integral therewith, formed from a single piece of sheet metal, having an annular depression therein, a flange formed about the edge of said rim, and a rim member having one edge thereof folded under so as to form an enlarged portion, and the other edge turned outwardly so as to form a complementary flange, whereby said folded edge may be engaged in said depression for completing the formation of the tire rim about said disk wheel.

3. A disk wheel and rim integral therewith, formed from a single piece of sheet metal, having an annular depression therein, a rim member having one edge thereof enlarged and a flange on the other edge adapted to be mounted over said wheel rim, whereby said enlarged edge will engage said annular depression, and an outer tire rim mounted around said wheel rim and rim member and clamped into position thereon by the adjacent flanges on said wheel rim and rim member engaging said outer tire rim.

In witness whereof, I have hereunto affixed my signature.

ROSCOE C. HOFFMAN.